(12) United States Patent
Zhao

(10) Patent No.: US 12,128,788 B2
(45) Date of Patent: Oct. 29, 2024

(54) SYSTEMS AND APPLICATIONS BASED ON MODULAR BATTERY PACKS

(71) Applicant: Ruichen Zhao, Fremont, CA (US)

(72) Inventor: Ruichen Zhao, Fremont, CA (US)

( * ) Notice: Subject to any disclaimer, the term of this patent is extended or adjusted under 35 U.S.C. 154(b) by 260 days.

(21) Appl. No.: 16/835,231

(22) Filed: Mar. 30, 2020

(65) Prior Publication Data

US 2020/0313249 A1 Oct. 1, 2020

Related U.S. Application Data

(60) Provisional application No. 62/827,096, filed on Mar. 31, 2019.

(51) Int. Cl.
| | | |
|---|---|---|
| *H01M 10/48* | (2006.01) | |
| *B60L 50/64* | (2019.01) | |
| *B60L 53/80* | (2019.01) | |
| *B60L 58/10* | (2019.01) | |
| *B60L 58/16* | (2019.01) | |
| *G06Q 10/087* | (2023.01) | |
| *G06Q 30/02* | (2023.01) | |
| *G06Q 50/06* | (2024.01) | |

(Continued)

(52) U.S. Cl.
CPC ............. *B60L 58/10* (2019.02); *B60L 50/64* (2019.02); *B60L 53/80* (2019.02); *B60L 58/16* (2019.02); *G06Q 10/087* (2013.01); *G06Q 30/0278* (2013.01); *G06Q 50/06* (2013.01); *H01M 10/4257* (2013.01); *H01M 10/482* (2013.01); *H01M 10/486* (2013.01); *H01M 50/204* (2021.01); *B60L 2200/10* (2013.01); *H01M 2010/4271* (2013.01); *H01M 2010/4278* (2013.01); *H01M 50/258* (2021.01); *H01M 2220/20* (2013.01)

(58) Field of Classification Search
CPC ............. H01M 10/48–488; H01M 2010/4278
See application file for complete search history.

(56) References Cited

U.S. PATENT DOCUMENTS 9,868,421 B2    1/2018    Hassounah
9,895,995 B2 *  2/2018    Dai ........................... C09J 5/00
(Continued)

FOREIGN PATENT DOCUMENTS

CN            107394297 A  * 11/2017
WO    WO 2010121829     * 10/2010

*Primary Examiner* — Jonathan Crepeau
(74) *Attorney, Agent, or Firm* — Jun Zheng

(57) ABSTRACT

Modular battery packs are disclosed and can be used in different devices and systems, such as electric vehicles, electric aircrafts, and electric scooters. Each modular battery pack includes a trace unit to record information about the battery pack, which is transmitted to a distributed data management system. The distributed data management system maintains a unique record entry for each modular battery back, based on which the residual fair market value can be assessed. This evaluation system facilitates the reselling, renting, and/or exchanging of modular battery packs at an online platform and/or at a physical battery sale, rental, and/or swapping station. Modular battery packs may also be recycled from one application to another application. For example, when a modular battery pack from an electric vehicle is degraded to certain level, it may be recycled and used in an energy storage system or other systems having lower requirements for battery performances.

20 Claims, 12 Drawing Sheets

(51) Int. Cl.
*H01M 10/42* (2006.01)
*H01M 50/204* (2021.01)
*H01M 50/258* (2021.01)

(56) References Cited

U.S. PATENT DOCUMENTS

| | | | | |
|---|---|---|---|---|
| 2010/0255385 | A1* | 10/2010 | Wolf | H01M 12/08 |
| | | | | 361/679.01 |
| 2013/0011719 | A1* | 1/2013 | Yasui | H01M 50/258 |
| | | | | 429/159 |
| 2014/0229129 | A1* | 8/2014 | Campbell | B60L 50/15 |
| | | | | 702/63 |
| 2016/0013523 | A1* | 1/2016 | Anzicek | H01M 10/486 |
| | | | | 429/61 |
| 2017/0093156 | A1 | 3/2017 | Ozbek et al. | |
| 2017/0093157 | A1 | 3/2017 | Pierquet et al. | |
| 2017/0232864 | A1* | 8/2017 | Kim | H01M 10/443 |
| | | | | 307/10.7 |
| 2018/0267108 | A1* | 9/2018 | Morita | H01M 10/486 |
| 2018/0366791 | A1* | 12/2018 | Kondo | H02J 7/00309 |
| 2018/0375176 | A1* | 12/2018 | Sakabe | H02J 7/00714 |
| 2020/0016984 | A1* | 1/2020 | Mantea | H01M 50/20 |
| 2021/0004882 | A1* | 1/2021 | Nakajima | G06Q 30/0601 |
| 2021/0005066 | A1* | 1/2021 | Molchadsky | G01R 31/00 |

\* cited by examiner

SYSTEMS AND APPLICATIONS BASED ON MODULAR BATTERY PACKS

CROSS-REFERENCE TO RELATED APPLICATIONS

This application claims priority to U.S. Provisional Patent Application No. 62/827,096, filed on Mar. 31, 2019 and entitled, "Systems and Applications Based on Modular Battery Packs," the entire contents of which are herein incorporated by reference.

This application is also related to U.S. Provisional Application Nos. 62/781,562 (filed Dec. 18, 2018 and entitled "Modular Battery Packs"), and 62/794,965 (filed Jan. 21, 2019 and entitled "Systems and Methods for Electric Vehicles with Modular Battery Packs"), and U.S. patent application Ser. No. 16/278,133 (filed Feb. 17, 2019 and entitled "Systems and Methods for Electric Vehicles with Modular Battery Packs"), the entire contents of these applications are also incorporated by reference herein.

BACKGROUND

1. Field of the Invention

The present invention relates generally to battery packs and related applications, and more particularly, but not by way of limitation, to modular battery packs and systems and methods using the modular battery packs.

2. Description of Related Art

In the current industry practices, different types of battery packs are designed and manufactured for different types of electric applications. For example, one type of battery pack is manufactured for electric vehicles, another type of battery pack is manufactured for electric scooters, and yet another type of battery pack is manufactured for energy storage systems (e.g., from wind farms or solar farms). The practice of using a different battery pack design for different types of applications is very cost inefficient, in terms of design costs and manufacturing costs. Further, the current practice brings inconvenience to customers because they cannot interexchange their battery packs between their devices. For example, currently electric vehicles use battery packs that are specially manufactured for certain models of electric vehicles: battery packs for Telsa electric vehicles are specially designed and manufactured for those models and cannot be easily configured for electric vehicles by other manufacturers such as Nissan and BMW. Therefore, there is a need for modularized battery packs where a universal battery pack design can be used in different types of applications, such as electric vehicles, electric scooters, electric aircraft, power storage, etc.

Further, in the current industry practices, battery packs for electric vehicles are not readily configurable. When a consumer buys an electric vehicle, he has very limited freedom in terms of how he wants to configure the battery packs of his electric vehicle. And after the purchase, a consumer has very limited economical options to reconfigure the battery packs installed on his electric vehicle.

Another problem with the current practices is that it takes a long time to charge batteries for an electric vehicle. For example, even at a Tesla supercharging station, it will usually take over 20 minutes to partially charge a Tesla electric vehicle and could take over an hour to fully charge the electric vehicle. Such long wait to charge an electric vehicle waste lots of time and causes inefficiency.

In addition, the value of a used battery is very hard to asses based on the current industry practice, therefore hindering the exchange of used batteries in the secondary market. There is no reliable means to evaluate the heath of a battery, e.g., based on its use history and current condition, based on which an accurate price can be assigned to it in a resale market.

SUMMARY

One object of the present disclosure is to provide universal modularized battery packs that can be used and interexchanged in various applications. A modular battery pack can be used as a building block to build larger battery packs that satisfy all sorts of power storage or supply needs. The same modular battery packs can be used across different devices in the same category (such as electric vehicles of different models and/or from different manufacturers) and devices across different categories (such as electric vehicles, electric aircrafts, electric appliances, electric scooter, etc.). This will largely reduce the costs of designs and manufacturing of different types of battery packs for different devices. This technology would also significantly reduce the total battery demand to maintain global transportation and energy needs.

Another object of the present disclosure is to provide systems and methods to efficiently record and manage data related to the health and value of the modular battery packs. A trace unit may be integrated into each modular battery pack to record data related to the health and value of the battery pack. The data is then transmitted to and managed by a distributed data management system. Based on the data records of a modular battery pack, its residual fair market value may then be accessed. This evaluation system may be used to support the selling, renting, and/or exchanging of modular battery packs between different parties.

An online exchange platform is also provided for modular battery packs. Users of the platform may sell, rent, and/or exchange modular battery packs with each other. The transactions conducted through the online platform may be supported by the evaluation system which accesses the fair market value of the modular batteries, and/or a distributed data management system that facilitates the fulfillment and recording of the transactions involving the modular battery packs.

Another object of the present disclosure is to provide electric vehicles with easily configurable and detachable battery modules, which may include a battery module that includes a plurality of modular battery packs. The modular battery packs can be connected in series, in parallel, or the mix thereof depending on the power supply needs of the electric vehicle. Each of the plurality modular battery packs can be detached without affecting the normal functions of the electric vehicle. The number of modular battery packs installed on the electric vehicle can be configured by the manufacturer, retailer, and/or customer based on the customer's needs.

Yet another object of the present disclosure is to provide systems and methods of servicing electric vehicles with modular battery packs. Battery swapping and/or renting stations allows electric vehicle users to swapping batteries whose charges run low with fully charged batteries and/or to rent additional batteries to temporary use. A centralized or distributed data system may be used to track each modular battery pack's condition such use history, designed capacity, capacity degrade, charge cycles, etc. The costs of battery swapping and/or renting or the cost of the battery itself can thus be based on the historic operating conditions of the modular battery packs.

When the conditions of modular battery packs degrade, they can be recycled and used for other applications that have low performance requirements of battery packs, particularly with lower charging and discharging rates. For example, when the condition of a modular battery pack used on an electric vehicle degrades to a certain level, it can be recycled and used as energy storage purposes. The recycled modular battery pack may be used together with other battery packs and connected to a power grid and be charged with the redundant power from the power grid. And the electrical energy stored in these modular battery packs can then be used to provide power to consumers, charge other battery packs, etc.

An electric vehicle with configurable and detachable battery packs is disclosed. In some embodiment, the electric vehicle comprises: one or more electric motors, each connected to a power interface; a battery module configured to receive a plurality of battery packs and to provide electricity to the one or more electric motors; and a control unit coupled to the one or more electric motors and the battery module, the control unit configured to control the electric supply from the battery module to the one or more electric motors. The battery module is configured such that each of the plurality of battery packs is detachable and the battery module is functional when one or more of the plurality of battery packs are detached.

A method for manufacturing an electric vehicle is disclosed. In some embodiments, the method comprises: providing one or more electric motors, each connected to a power interface; providing a battery module configured to receive a plurality of battery packs and to provide electricity to the one or more electric motors; and coupling a control unit to the one or more electric motors and the battery module, the control unit configured to control the electric supply from the battery module to the one or more electric motors. The battery module is configured such that each of the plurality of battery packs is detachable and the battery module is functional when one or more of the plurality of battery packs are detached.

A method for providing a battery pack to an electric vehicle is disclosed. In some embodiments, the method comprises: charging multiple battery packs; making the multiple battery packs available at a station; and providing, at the station, one or more of the multiple battery packs to a user of an electric vehicle for installation in a battery module of the electric vehicle. The battery module is configured to receive a plurality of battery packs and to provide electricity to the one or more electric motors, and further configured such that each of the plurality of battery packs is detachable and the battery module is functional when one or more of the plurality of battery packs are detached.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DESCRIPTION OF ILLUSTRATIVE EMBODIMENTS

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system or apparatus that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps.

Further, a structure (e.g., a component of an apparatus, such as a cable) that is configured in a certain way is configured in at least that way, but it can also be configured in other ways than those specifically described.

Modular Battery Packs

Figure 1:
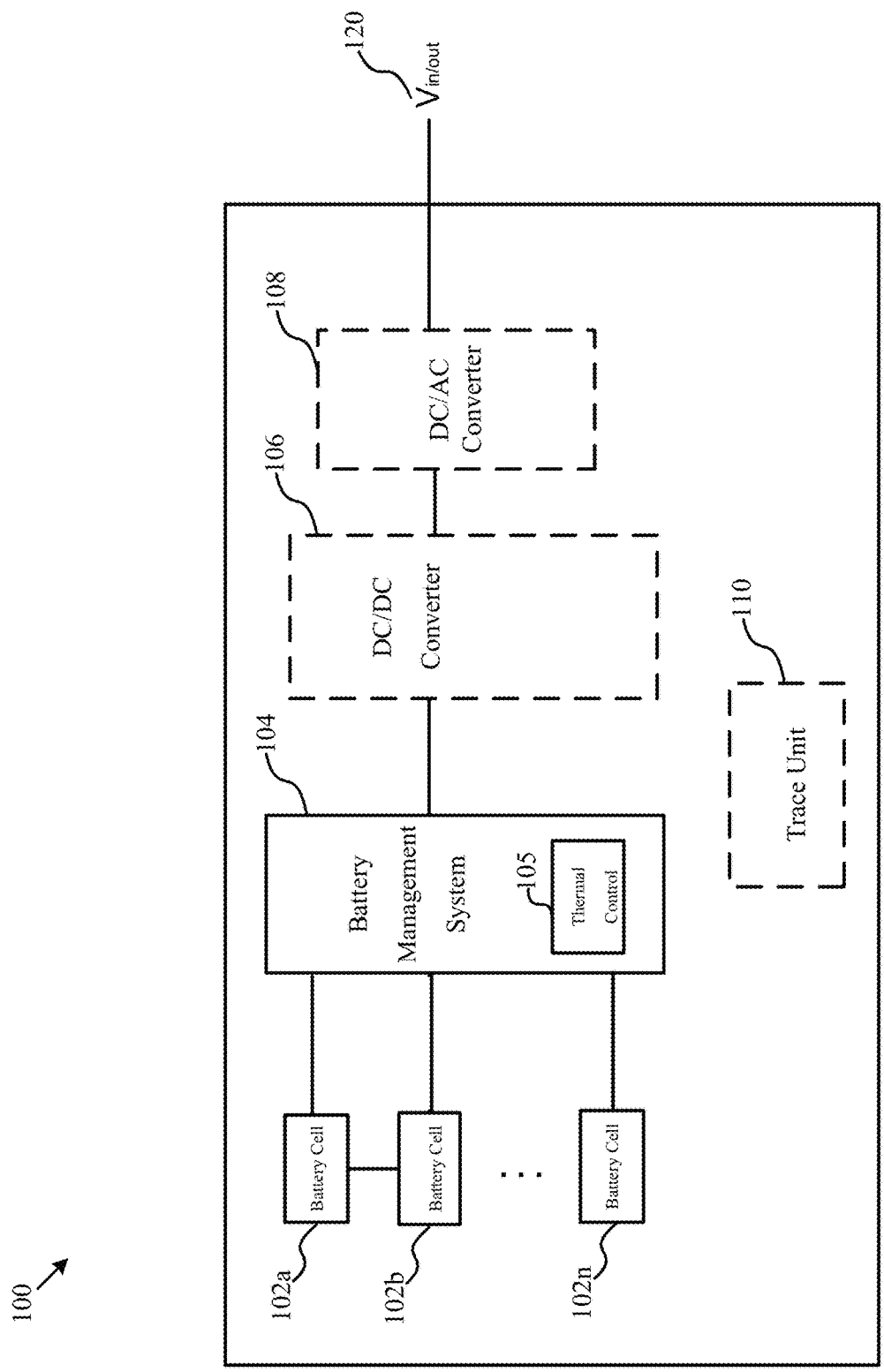
FIG. 1 illustrates a modular battery pack according to one aspect of the present disclosure.

FIG. 1 illustrates an example of a modular battery pack 100. In the depicted embodiment, battery pack 100 includes one or more battery cells 102a, 102b, . . . 102n, each connected to a battery management system 104, which is in turn connected to a converter 106. Battery cells 102a, 102b, . . . 102n may be connected in series provide higher voltage or in parallel to provide higher current, or the mix thereof. Each cell may be an industrial cell that can be easily charged and then supply power to various devices. Each battery cell may have a wide range of capacities available on the market.

Battery management system 104 may monitor the conditions and operating status of each battery cell and determining an operating mode for the cell. For example, battery management system 104 may include a thermal control system 105, which monitors (e.g., using a thermal sensor) the temperature of the battery cells and control the temperature of modular battery pack 100 to avoid operating the battery pack at a temperature that is too high or too low. When the temperature of certain battery cells goes above a high threshold or below a low threshold, battery management system 104 may shut off those battery cell(s). Similarly, battery management system 104 may shut off battery cells whose charge runs critically low, or when the cells have been fully charged to prevent overcharge, or the cells undergo an over current or short-circuit condition. In some embodiments, battery management system 104 may shut off the whole battery pack when some of the battery cells are not operating within the normal ranges (for example, the battery cells overheat or the temperature is too low, or charges run critically low) to ensure the optimal operation of the whole modular battery pack 100. Battery management system 104 may also be configured to monitor the health of battery cells 102 and indicate (e.g., by sending signals to an LED indicator or other system controllers) the health level of the battery cells and send alerts if one or more battery cells malfunctions.

In some embodiments, DC/DC converter 106 may be a CLLC converter, a dual-active-bridge converter, a full bridge converter, or any other type of DC/DC converter, which is described in more details below. Converter 106 may function as a DC/DC converter to provide a desired DC voltage output for modular battery pack 100. For example, a battery cell 102 may provide a DC voltage of 2.0V to 4.2V, battery management system 104 may provide a DC voltage of 30V to 400V, and converter 106 may convert the voltage input from battery management system 104 to a 400V DC output. In some embodiments, converter 106 may be other types of converters, such as a non-isolated boost converter or a conventional isolated full bridge converter (as defined from voltage stepping-up perspective). In some embodiments DC/DC converter 106 may be integrated into modular battery pack 100, or included in an electric device such as an electric vehicle that uses modular battery packs, or included in both or either modular battery pack 100 and/or electric devices. When DC/DC converter 106 is integrated in modular battery pack, it can be configured such that it can be overridden by a DC/DC converter included in an electric device such an electric vehicle using the modular battery pack.

In some embodiments, when AC output is needed, modular battery pack 100 may also include a DC/AC converter 108 so that battery pack 100 supply AC power to an external device. DC/AC converter 108 may be integrated into battery pack 100 and is only activated when AC power supply is needed from battery pack 100. Alternatively, DC/AC converter 108 may be manufactured as an accessory part and then connected to battery pack 100 whenever necessary. DC/AC converter 108 may also be included in an electronic device that requires AC input and converts the DC output from modular battery pack 100 into AC input for the device.

Generally, DC or AC power is supplied from battery pack 100 through port 120 to an external device. Port 120 can be configured to also charge battery cells 102 included battery pack 100. Battery management system 104 may monitor the charge levels of battery cells 102 and indicate (e.g., by changing the color of an LED indicator of the modular battery pack 100) when the charges of battery cells are low and need to be recharged. Similarly, battery management system 104 may send signals to indicate that battery cells 102 are fully charged and also shut off the charging power supply to prevent overcharging the battery cells.

In some embodiments, a trace unit 110 may be also integrated into modular battery pack 100. As will be described in more detail below in FIG. 5, trace unit 100 may include sensors, processor, memory, communication interfaces, and other components. Trace unit 100 may be configured to monitor and record certain aspects relating to the health of battery pack 100, such as the capacity, charge cycle, ability to hold charges, output voltage, use history (e.g., age, re-sale history, charge history, damages caused by water, heat, cold, etc.). Data related to the health of the battery may be generated, stored, and transmitted through a wireless channel to a server for later use.

Figure 2A:
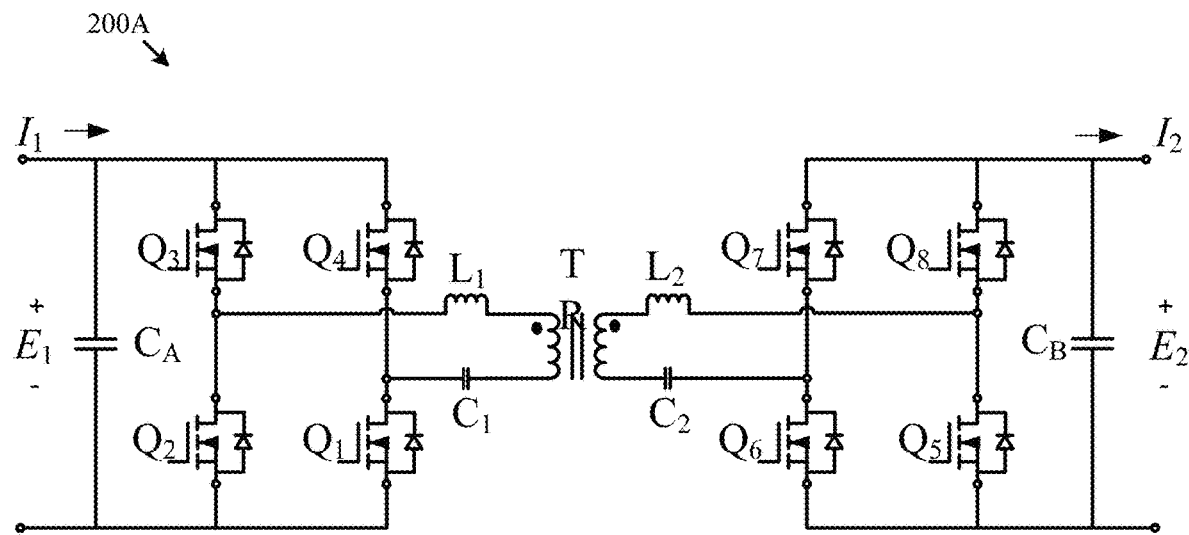
FIG. 2A illustrates an example of a DC/DC converter for a modular battery pack according to one aspect of the present disclosure.
Figure 2B:
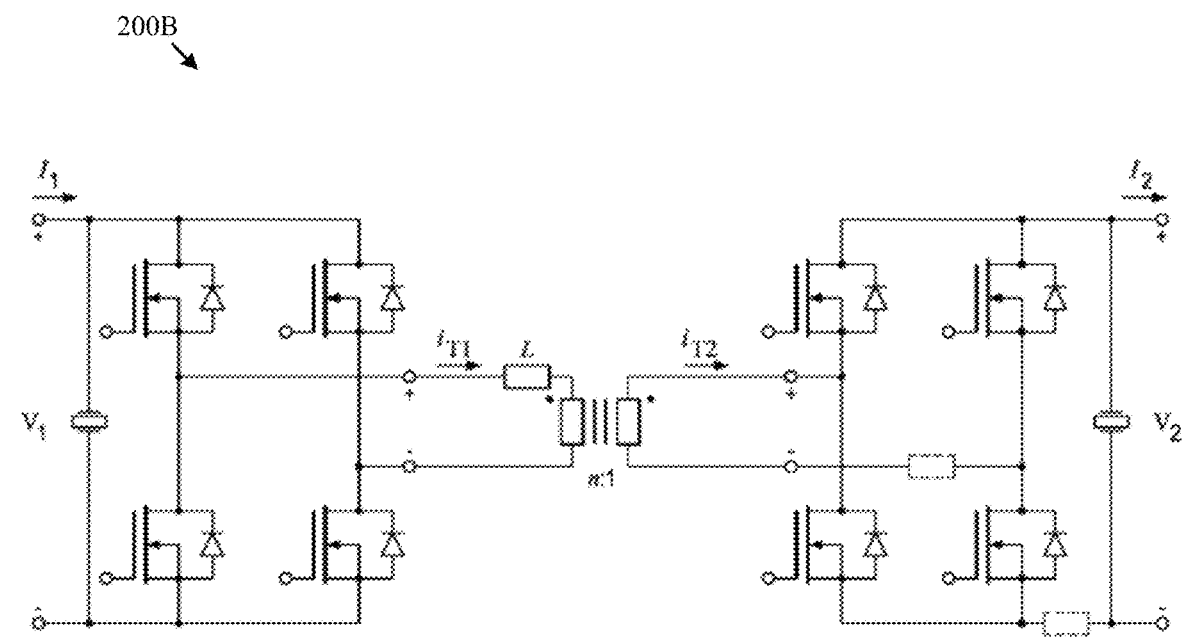
FIG. 2B illustrates an example of a DC/DC converter for a modular battery pack according to one aspect of the present disclosure.

FIGS. 2A and 2B illustrates examples of DC/DC converters that can be used for battery pack 100. FIG. 2A illustrates an example of a CLLC resonant converter 200A for battery pack 100. In the depicted embodiment, CLLC resonant converter 200 includes eight switches, Q1, Q2, . . . Q8, with four switches distributed on the left and right side of a transformer TR, respectively. Each switch may be a transistor switch, such as an MOSFET. Transformer TR is connected to L1 and C1 on one side, and L2 and C2 on the other side, which together forms a resonant network. CLLC resonant converter 200A may further include filters CA and CB, one of which is connected to the source side and the other connected to the load side. Current flows I1 and I2 through CLLC resonant converter 200A are bi-directional. Thus, in one embodiment, E1 can be the source and E2 the load, and in another embodiment, E2 can be the source and E1 the load.

For example, in one embodiment, E1 is connected to battery management system 104 as described in FIG. 1, where battery pack 100 is used to supply power to an external device. In this case, E1 is the source end of CLLC resonant converter 200A, and E2 is the load end connected to the external device; both I1 and I2 flow from left to right, switches Q1-Q4 function as a square wave generator, and switches Q5-Q8 function as a rectifier. When an external power source is connected to E2 to charge battery pack 100, the roles of the parts reverses: E2 becomes the source end and E1 becomes the load end connected to battery cells 102.

FIG. 2B illustrates an example of a dual-active-bridge (DAB) 200B DC/DC converter for battery pack 100. The dual-active-bridge converter can perform current sampling and/or operate in a burst mode in which its output varies as compared to a continuous mode of operation. It should be understood that other than CLLC resonant converter 200A and dual-active-bridge converter 200B, DC/DC converter 106 may be implemented as a full bridge converter or other DC-to-DC converter topologies in some embodiments.

Battery packs 100 may be manufactured in modularized units, such that multiple battery cells may be readily connected in series, in parallel, or the mix thereof to satisfy various power supply needs, e.g., from external devices requiring different voltage and/or current levels. The modularized battery packs 100 have a distinct advantage over the current battery industries, where different types of battery packs are manufactured for different devices. For example, in the current industry practices, one type of battery pack is manufactured for electric vehicles, another type of battery pack is manufactured for electric scooters, and yet another type of battery pack is manufactured for energy storage systems (e.g., from wind farms or solar farms). By modularizing battery packs 100 described above, a universal battery pack can be used in various situations; a modular battery pack 100 can be used as a building block to build larger battery packs that satisfy all sorts of power storage or supply needs. This will largely reduce the costs of designs and manufactures of different types of battery packs.

In some embodiments, battery pack 100 may also include a thermal control system. Air cooled or liquid cooled technologies can be used. The thermal control systems may be connected in series or parallel. The thermal control system may be integrated in to battery pack 100 so that battery pack 100 may be integrated into a single unit and modularized as described above.

Figure 3:
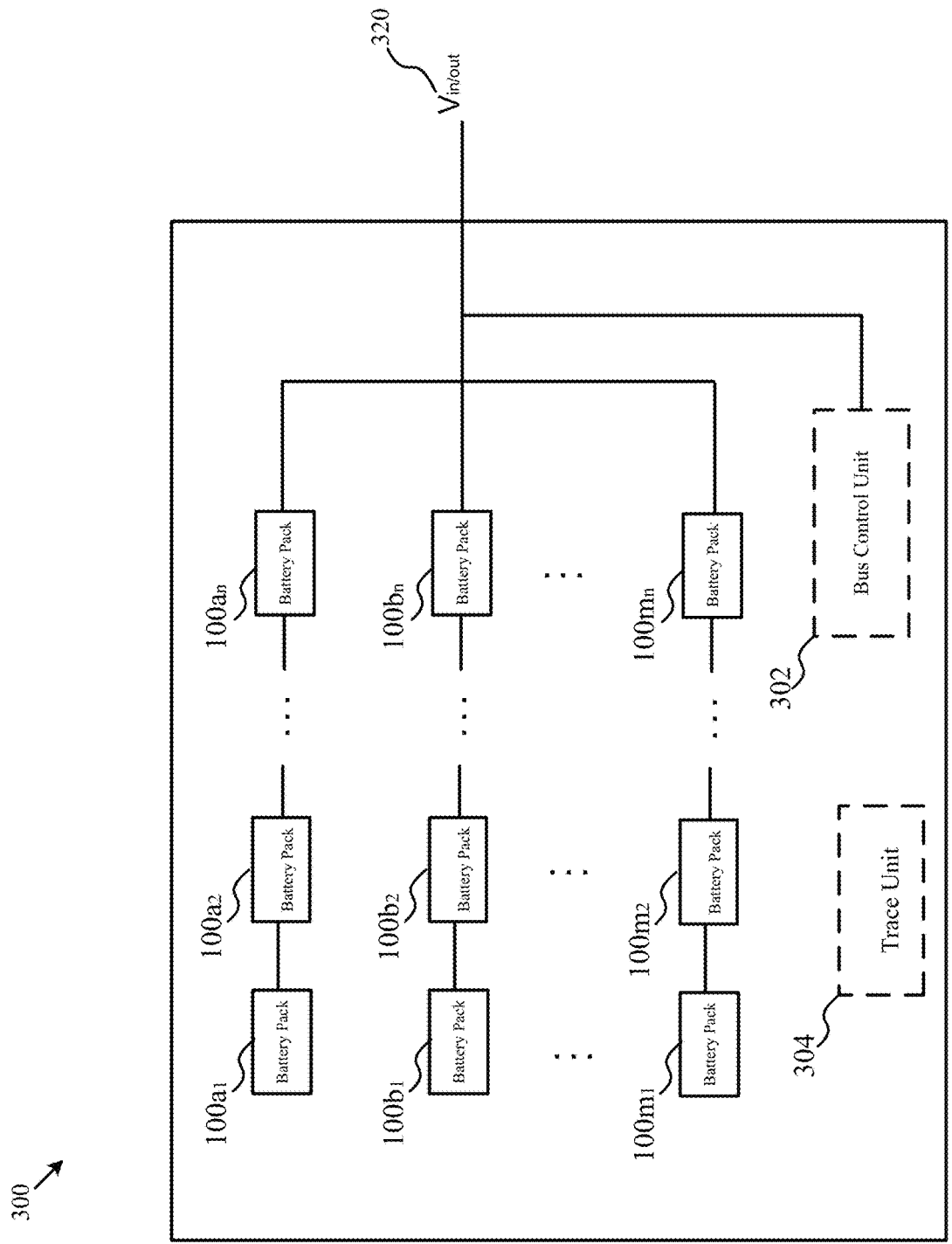
FIG. 3 illustrates an example of stacking multiple modular battery packs into a larger battery pack according to one aspect of the present disclosure.

FIG. 3 illustrate examples of stacking a plurality of modular battery packs 100 into a larger battery module 300 for different power supply needs. As depicted in FIG. 3, a plurality of modular battery packs 100 are connected in a mixed fashion to form a larger battery pack module 300. For example, battery packs 100a1, 100a2, . . . 100an are connected in series to form a sub-module 100a; battery packs 100b1, 100b2, . . . 100bn are connected in series to form a sub-module 100b; . . . ; battery packs 100m1, 100m2, . . . 100mn are connected in series to form a sub-module 100m. Then, the sub-modules 100a, 100b, . . . 100m are connected in parallel to form the final stacked battery pack module 300. Or, sub-modules can be connected in parallel first, then further be connected in series. With different combinations of connections using any number of modular battery packs 100, one can build a battery module 300 to satisfy any requirements of voltage or current output levels. It should be noted that different numbers of modular battery backs 100 may be connected in series, parallels, or the mix therefor into larger battery modules 300 in various ways other than that described above. Further, one or more modular battery packs 100 may be readily added to or removed from battery module 402, without affecting the normal functions of battery module 402.

In some embodiments, battery pack module 300 may further include a bus control unit 302. Bus control unit 302 may be configured to control the output voltage of individual modular battery packs 100 so that battery pack module 300 provides a stable voltage output 320. In some embodiments, bus control unit 302 may include a conventional battery pack, a capacitor, a fuel cell, a power electronics device, and/or another modular battery pack.

Bus control unit 302 may be integrated into battery pack module 300, or alternatively be supplied as a separate unit and connected to battery pack module 300. For example, bus control unit 302 may be pre-installed on an electric vehicle and connected to modular battery packs 100 and/or battery pack modules 300 when the battery packs or battery modules are installed on the electric vehicle. When bus control unit 302 is installed in an electric vehicle, it may be configured to control or clamp the bus voltage in parallel with one or multiple modular battery packs 100 and/or one or more battery pack modules 300. It should be noted that bus control unit 302 is optional in some embodiments. Generally, bus control unit 302 does not include an DC/DC converter, while modular battery packs 100 may include a DC/DC converter, such as illustrated FIG. 1 (e.g., DC/DC converter 106). In a preferred embodiment, when bus control unit 302 is installed in battery module 300, each of modular battery packs 100 would include a DC/DC converter, while bus control unit 302 does not include a DC/DC converter.

In some embodiments, battery pack module 300 may also include a trace unit 304. As will be described in more detail below in FIG. 5, trace unit 304 may include sensors, processor, memory, communication interfaces, and other components. Trace unit 304 may be configured to monitor and record certain aspects relating to the health of battery pack module 300, such as the capacity, charge cycle, ability to hold charges, output voltage, use history (e.g., age, re-sale history, charge history, damages caused by water, heat, cold, etc.). Data related to the health of the battery may be generated, stored, and transmitted through a wireless channel to a server for later use. As discussed above in FIG. 1, individual battery packs 100 may also each include a trace unit 110. It should be noted that trace unit 304 may be used in addition to trace unit 110 for individual battery packs, or in the alternative of trace unit 110.

Individual battery packs 100 or their stacked versions into large battery pack modules 300 as described in FIG. 3 may be used to supply DC and/or AC power to any external devices that requires electric power supply, such as electric vehicles, electric scooters, electric aircrafts (unmanned or manned aircrafts), electric boats, battery swap stations (e.g. for fast electric vehicle recharging), or other electric appliances. Battery packs 100 may also be used in devices equipped with solar panels, such that battery packs 100 may be charged by solar energy collected by solar panels and then supply power to the devices. Stacked battery packs 100 may also be used as energy storage systems. For example, a plurality of battery packs 100 may be stacked together to store redundant electricity generated by power stations and then used to supply power to a power grid when needed. This can be especially useful for wind power, solar power, or hydraulic power generation stations, where the amount of electricity generated depends on the source of wind, solar, or water flow, which generally cannot be controlled based on the amount of power consumption. Thus, when the wind, sunlight, or water flow is strong, redundant electricity (the amount that exceeds power consumption need at any certain time instance) is wasted and cannot be used later. Stacked battery packs 100 can be connected to the wind, solar, or hydraulic power grid and be charged by the redundant power in the grid. When the power consumption exceeds the amount of power generated by the power station, power can then be drawn from battery packs 100 for consumer use.

Electric Vehicles with Modular Battery Packs

Figure 4:
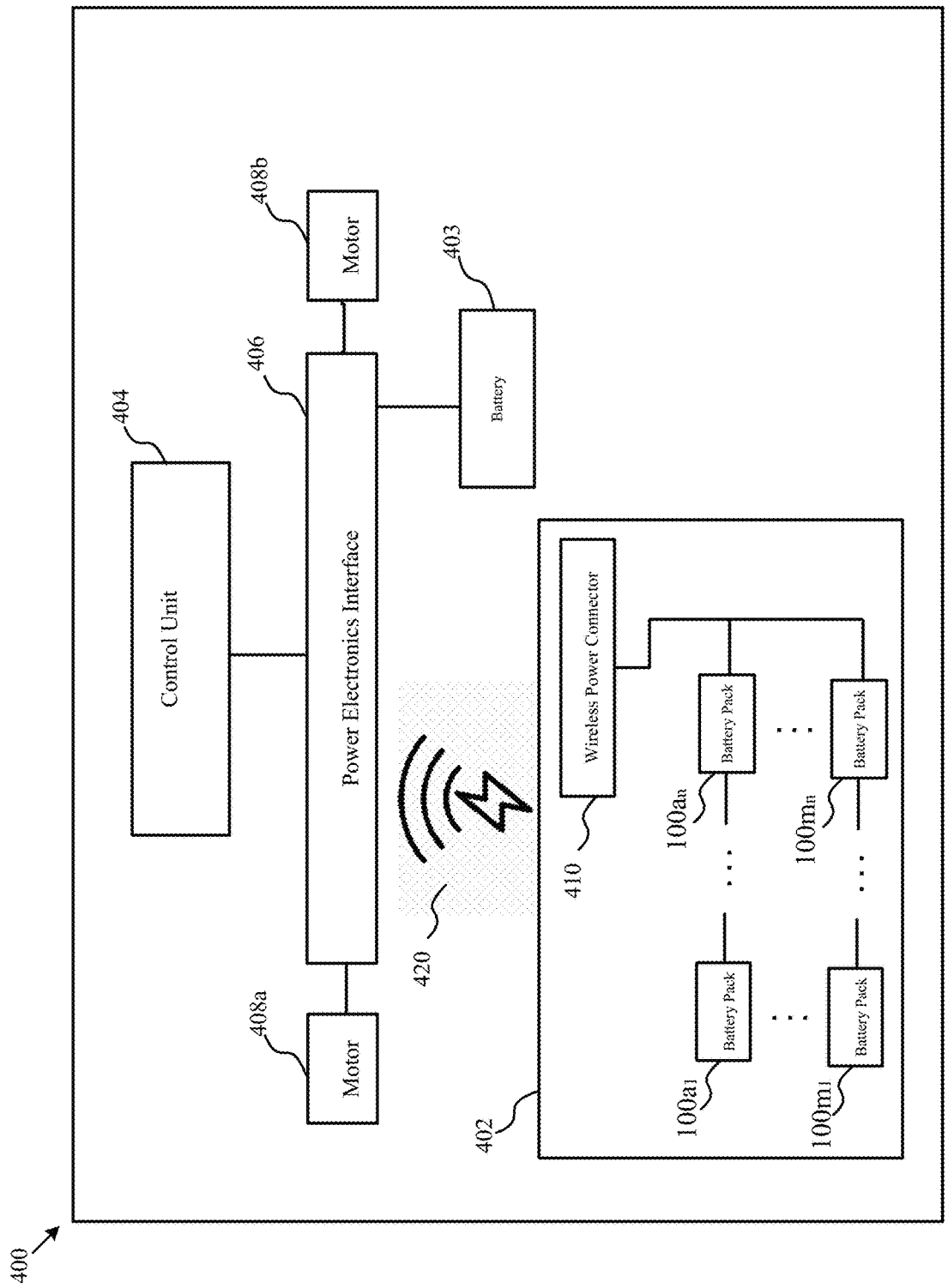
FIG. 4 illustrates an example of an electric vehicle installed with multiple modular battery packs according to one aspect of the present disclosure.

FIG. 4 illustrates an electric vehicle 400 configured to be powered by a plurality of modular battery packs 100. In the depicted embodiment, electric vehicle 400 may include a battery module 402, which may be readily detached from electric vehicle 400, and an additional battery 403. When installed on electric vehicle 400, battery module 402 and battery 403 are both electrically coupled to one or more motors 408a, 408b through a power electronics interface 406. A control unit 404 is connected to power electronics interface 406 to control the electricity supply from battery module 402 and/or battery 403 to motors 408a, 408b.

Battery module 402 may include a plurality of modular battery packs connected in parallel and/or in series, such as in a way described in FIG. 3 above. For example, battery module 402 may include a plurality of modular battery packs 100a1, . . . 100an, which are connected in series to form a sub-module. In some embodiments, battery module 402 may also include another plurality of modular battery packs 100m1, . . . 100mn, which are connected in series to form another sub-module, which may be connected in parallel to sub-module formed by modular battery packs 100a1, . . . 100an. It should be noted that battery module 402 may include any desired number of modular battery packs connected in series, in parallel, or the mix thereof to satisfy the designed power requirements for electric vehicle 400. Further, one or more modular battery packs 100 may be readily added to or removed from battery module 402, without affecting the normal functions of battery module 402. Each modular battery pack 100 may be integrated with a trace unit 110, such as that described above in FIG. 1.

In some embodiments, battery module 402 may include a wireless power connector 410, which is electrically coupled to each modular battery pack 100. With wireless power connector 410, battery module 402 may supply electricity through a wireless channel 420 to power electronics interface 406, which in turn supplies electricity to motors 408a, 408b. Wireless power connector 410 may also be configured to receive electricity from an energy source and charge modular battery packs 100.

Wireless power connector 410 can bring a number of advantages over traditional wired power connections. For example, wireless power connector eliminates the risk of mechanical fatigue and failure of the wire from repeat mechanical use. Unlike wired connections which are limited by the length of the wire, wireless power connectors are relatively not subject to such limitation, and therefore provides more freedom as to where battery module 402 may be placed in the vehicle. Further, wireless connections do not take as much space as wired connections, which allows battery module 402 to be made in a more compact size. In some embodiment, modular battery packs 100 may share a wireless power connector 410. Alternatively, each modular battery pack 100 may include a wireless power connector.

Battery module 402 and battery 403 may be configured for different functions in electric vehicle 400. For example, battery 403 may be a power battery with a high voltage output but low storage capacity, which can be used to provide a high energy output in a short period of time, e.g., for starting and/or accelerating electric vehicle 400. On the other hand, battery module 402 may be configured to function as an energy battery, which has a lower voltage output and high storage capacity, which can be used to provide a steady energy output for a long period of time, e.g., for long distance drive of electric vehicle 400. Such mixed power supply from a power battery (e.g., battery 403) and energy battery (e.g., battery module 402) may achieve efficient energy use and also support the required performances of the electric vehicle.

Battery 403 may be pre-installed on electric vehicle 400 and connected to power electronics interface 406, e.g., through a wired connection. Battery 403 may be a modular battery pack or a conventional energy storage device that has a high voltage output. For example, battery 403 may have a voltage level of approximately 400 V, an energy capacity of approximately 30 kWh, and a rated power of approximately 90 kW. Battery 403 may be configured to clamp the bus voltage on an electric vehicle effectively and provide pulsating power needs during the start or acceleration of the electric vehicle. If modular battery packs 100 are not installed on electric vehicle 400 yet, then electric vehicle 400 may be only powered by battery 403, which functions as an independent energy storage system, but can support a relative short range (for example, the energy stored in battery 403 may provide a distance range of approximately 100 miles for electric vehicle 400). When additional modular battery packs 100 are installed on electric vehicle 400 (through batter module 402), they can function as additional energy sources. For example, each modular battery pack 100 may have a voltage level of about 4 kW and energy capacity of about 4 kWh; then if electric vehicle 400 is installed with ten modular battery packs 100, the electric vehicle would have a total maximum voltage level of 130 kW (i.e., 90 kW from bus control unit 302 and 40 kW from ten modular battery packs 100) and a maximum energy capacity of 70 kWh (i.e., 30 kWh from battery 403 and 40 kWh from ten modular battery packs 100).

Power electronics interface 406 may include one or more inverters configured to provide the proper electric voltage input to motors 408a, 408b. In some embodiments, power electronics interface 406 may also include one or more DC/DC converters, such as CLLC converters, DAB converters, resonant converters, full bridge converters, or the like such as described above. When one or more of the individual modular battery packs 100 also include a DC/DC converter integrated within, the DC/DC converters in power electronics interface 406 may be configured to override the DC/DC converters in individual modular battery packs 100.

The use of modular battery packs in battery module 402 makes it easily configurable. One or more individual modular battery packs in battery module 402 can be easily removed from battery module 402, and the remaining battery packs in battery module 402 can still provide enough power supply for electric vehicle 400 to function normally. Conversely, one or more modular battery packs can be easily added to battery module 402 to provide longer battery range for electric vehicle 400. The easy configuration of battery module 402 for electric vehicle 400 brings a number of benefits to the manufacturing, use, and maintenance of electric vehicle.

In one scenario, the ease of modular battery pack configuration allows an electric vehicle manufacturer, retailer, and/or customer to configure an electric vehicle on demand. For example, to reduce the cost of electric vehicle 400, a user can buy electric vehicle 400 installed with the minimum number of battery packs (say, six modular battery packs, just as an example), which could provide a battery range for normal daily uses (say, one full battery charge can last for 200 miles). On the other hand, another user may want longer range for his electric vehicle and may choose to buy an electric vehicle with more modular battery packs installed in the vehicle, (say, e.g., 10 modular battery packs or as many battery modular packs that the electric vehicle can house), so that he can get a longer distance for one full charge (e.g., 350 miles for one full charge). Essentially, an electric manufacturer or retailer can give its customers the option to configure their electric vehicles based on their needs and choose how many modular battery packs they want to install in their electric vehicles when they purchase electric vehicles.

In the current industry practice, a battery's value over its entire life cycle has not been exploited effectively. For instance, due to long distance drive needs, an electric vehicle, say, a Tesla Model S is equipped with a 100 kWh battery pack. Such a battery pack supports approximately a 350-mile range and such a battery pack costs around 30 thousand dollars. However, the average daily car mileage in the US in 2018 is approximately 30 miles. Hence, a 100-to-150-mile battery range vehicle would be sufficient for an electric car owner for everyday use. However, a car owner would need a 350-mile battery range vehicle for long-distance drive (which is a low-frequency need). The conventional architecture forces an electric vehicle owner to purchase a large battery pack (say 100 kWh) for low-frequency needs, which results in less effective use of such a high value asset. This problem can be solved by using modular battery packs which can be connected in parallel and dispatched independently. Therefore, an electric vehicle car owner can equip or adjust the battery size by demand: less battery packs can be used for everyday use, and more battery packs can be installed to a car for long-distance drive. As such, a car owner can adjust the number of modular battery pack by demand so the cost of car ownership can be significantly reduced. Furthermore, modular battery packs are smaller and lighter so it may be more cost-effective to swap modular battery packs than conventional bulky battery packs.

Each of the plurality of modular battery packs may be conveniently detached from the battery module 402, which can still normally function to power the motors with the remaining battery packs. The battery module may have a maximum capacity of receiving a predetermined number of battery packs, denoted as Bmax. At any given moment, the battery module may have any number (between 1 and Bmax) of battery packs installed in order to power the electric vehicle. When a plurality of battery packs are installed in the battery module, the battery packs may be connected in series, in parallel, or the mix thereof. The flexible configuration of the number of battery packs installed in the battery module thus allows an electric vehicle manufacturer, retailer, or a user to configure the electric vehicle based on the demand of the vehicle user.

The ease of modular battery pack configuration, also allows a customer to conveniently reconfigure his electric vehicle after purchase, for example, by purchasing, renting, or borrowing additional modular battery packs and installing them on his electric vehicle whenever needed. For example, if an electric vehicle owner needs to drive his vehicle for a long trip, he may purchase, rent, or borrow additional battery packs and install them on his electric vehicle before his trip. He can even bring extra battery backs with him so that when some of the battery packs run low on charge, he can simply replace those battery packs installed on his electric vehicle with the extra battery packs. Further, when some of the battery packs on an electric vehicle run low on charge, a customer may choose to charge only those individual battery packs instead of all battery packs installed on the electric vehicle, which may allow him to get the vehicle ready for use faster.

Reconfigurable electric vehicles with modular back packs also allows vendors to provide services such as battery renting, swapping, sharing, and/or recycling for electric vehicles owners and customers. For example, a battery renting station may have a plurality of fully charged modular battery packs in store, and rent out the battery packs to electric vehicle owners. The renting fee for each battery pack can be assessed based on the length of rental period and/or the amount electric charges used by the renter.

Similarly, a battery swapping station may store a plurality of fully charged modular battery packs and allow electric vehicle users to stop by the swapping station and swap one or more low-charge battery packs from their vehicles with one or more fully charged battery packs. The battery swapping station then recharges modular battery packs swapped from electric vehicle users and then place them on the stack for the next swapping. This battery swapping allows an electric vehicle user to quickly replace their battery packs when their charges run low, rather than waiting at a battery charging station, which can take a fairly long time to fully recharge an exhausted battery pack for a vehicle. Further, battery swapping stations may be configured to use clean energy such as electricity from a power grid connected to a wind farm or solar farm to charge the modular battery packs. In some embodiments, a station may provide both battery renting and swapping services.

Individuals can also to provide certain services to assist the efficient operation of reconfigurable electric vehicles with modular back packs. For example, an electric vehicle owner may rent out one or more of his modular battery packs (e.g., when he does not need them) to battery renting/swapping stations and receive certain payments from the battery pack lease. For the convenience of customers, battery renting/swapping stations may allow a customer to rent battery packs at one location and return them at another location. At a certain time period, some battery renting/swapping stations may end up having more battery packs than they need while other battery renting/swapping stations may end up having less battery packs than they need. In this situation, renting/swapping stations may request customers or individuals to transport one or more battery packs from one renting/swapping station to another renting/swapping station for a fee.

An additional way to exploit the residual value of a modular battery pack is to use a retired car modular battery pack in other applications, for example, as a stationary energy storage. One of the benefits of using modular battery packs is that they do not have to be dismantled before reuse. So the high value battery can have a second life with minimum effort.

Because universal modular battery packs are installed on electric vehicles such as electric vehicle 400 described above, when the battery packs are not needed for the electric vehicles, the battery packs can be used for other purposes too. For example, after a period of usage and/or certain number of recharging, a modular battery pack does not hold charge as well as before and may not be ideal for use in an electric vehicle. The degraded modular battery backs can then be recycled and used for other purposes, such as electricity storage for power grids connected to a power station (e.g., wind farm or solar farm), electricity storage for household uses, for other devices that have lower requirements for batteries, or the like.

Data Management System for Batteries

Figure 5:
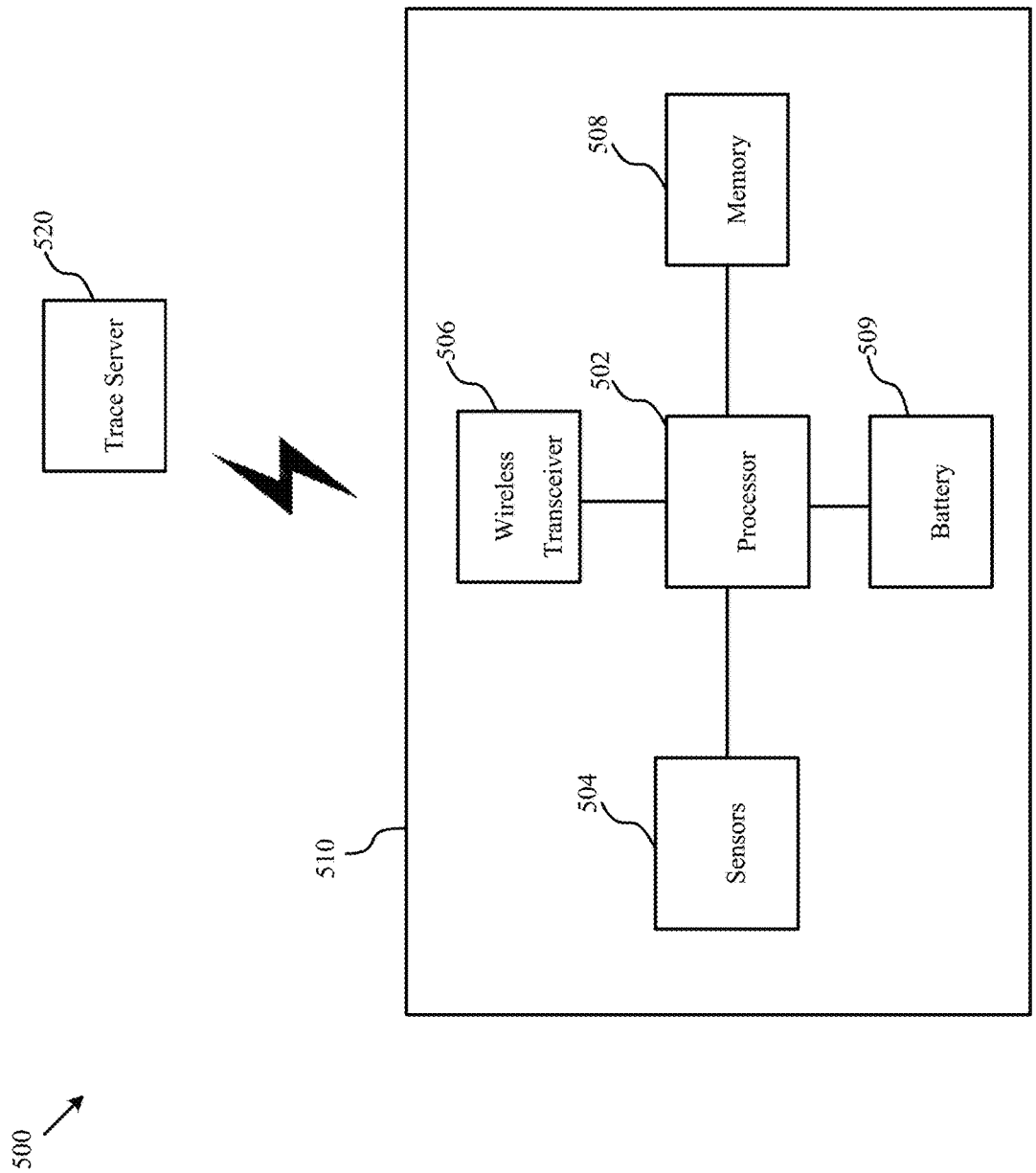
FIG. 5 illustrates a tracing system for modular battery packs according to one aspect of the present disclosure.

FIG. 5 illustrates a tracing system 500 for modular battery packs according to one aspect of the present disclosure. Tracing system 500 may include a trace unit 510 and a trace server 520. Trace unit 510 may be integrated into one or more modular battery packs and configured to track the health of the modular battery packs, such as those described in FIGS. 1 and 3. Each trace device may be assigned a universal pack code (UPC) that is unique to the battery pack in which the trace device is integrated.

In the depicted embodiment, trace unit 510 includes a processor 502, one or more sensors 504, a wireless transceiver 506, memory 508, and a battery 509. Sensors 506 may be configured to monitor various aspects related to the state of the battery pack, for example, location, voltage, capacity, remaining charge, charge cycle, temperature, humidity, and the like. Data generated by sensors 506 may be processed by processor 502 and stored in memory 508. In addition to storing data generated by sensors 504, memory 508 may also store other data related to the battery pack, such as the UPC, design capacity, manufacturing data, etc. Under the operation of processor 502, wireless transceiver 506 may transmit data stored in memory 508 to trace server 520 via a wireless communications channel.

In some embodiments, in order to reduce the power consumption and/or the cost, memory 508 may not have a big capacity. If so, memory 508 may be configured to save the most recent data generated by sensors 504. Trace unit 510 may be configured to periodically transmit data to trace server 520 so that memory 508 only need to store the most recent data generated by sensors 504. For example, memory 508 may be configured to only store data generated in the most recent three days, and data older than three days is automatically erased from memory 508. When the remaining available memory in memory 508 has reached a predetermined level, trace unit 510 may also be configured to automatically erase old data in memory 508 that has been already transmitted to trace server 520.

Trace unit 510 may be configured to receive commands from trace server 520 and perform certain operations according to the received commands. For example, trace server 520 may send interrogation signals to trace unit 510 periodically to make sure that trace unit 510 is functioning normally, or to request trace unit 510 to transmit data to the server, or to reconfigure trace unit 510. It should be understood that trace unit 510 is an Internet of Things (IoT) device because of its capability to connect to other devices on the Internet through wireless communication channels.

Trace unit 510 may include a battery 509 such that it is self-powered. In order to reduce battery consumption, the frequency of data transmission from trace unit 510 to trace server 520 may be configured such that minimal energy is consumed while performing the necessary function. Further, the frequency of data transmission from trace unit 510 may be reconfigured by commands from trace server 520 as needed. In some embodiments, battery 509 may be recharged by the battery pack the trace unit 510 is integrated in. For example, trace unit 510 may monitor the charge level in battery 509; when the battery level has reached a lower limit, trace unit 510 may request that the battery pack having trace unit 510 to charge battery 509, e.g., through wireless energy transfer.

Figure 6:
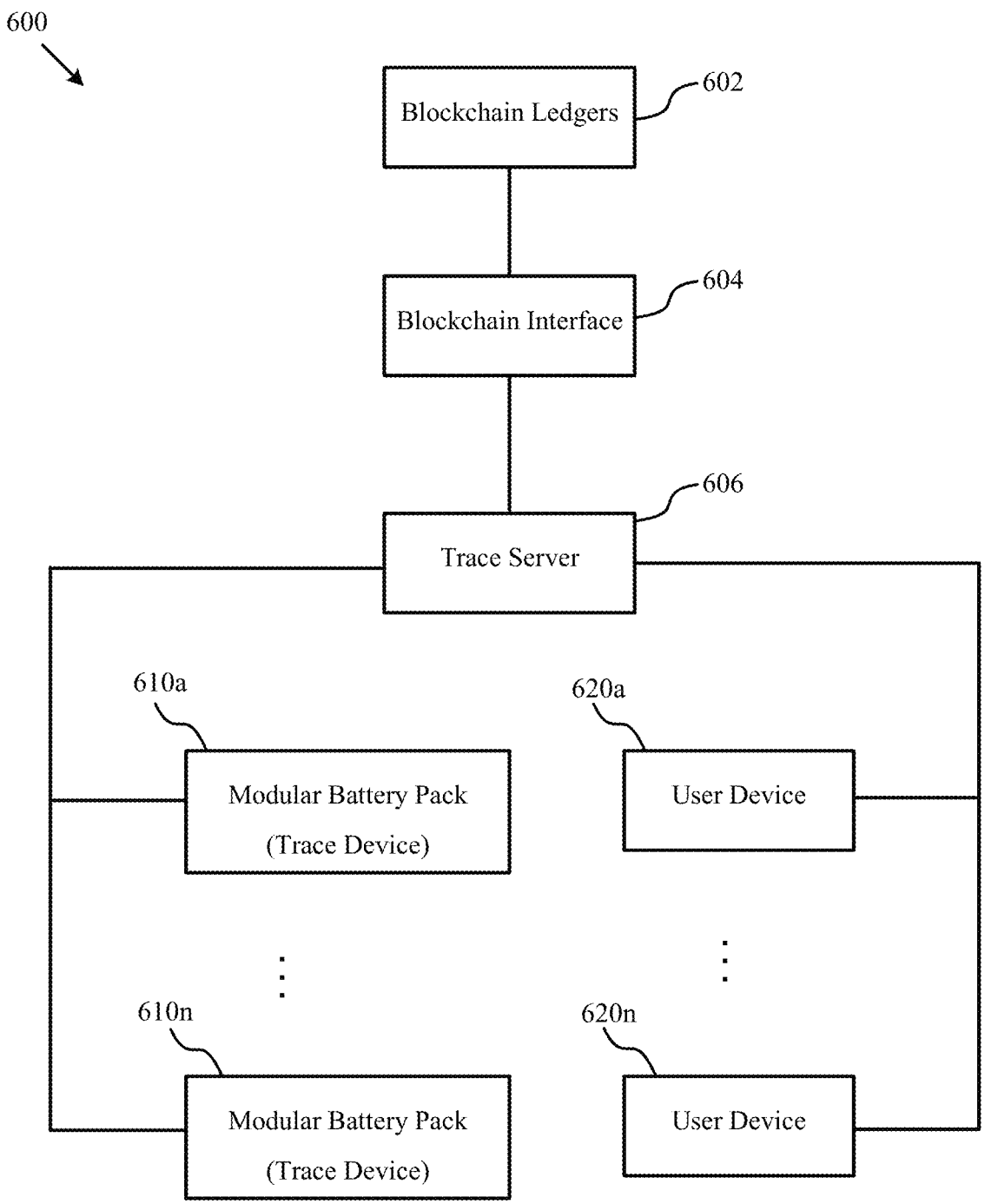
FIG. 6 illustrates a data management system about modular battery packs according to one aspect of the present disclosure.

FIG. 6 illustrates a data management system 600 about modular battery packs according to one aspect of the present disclosure. In the depicted embodiment, system 600 include a trace server 606 connected to one or more blockchain ledgers 602, through a blockchain interface 604 functions. Trace server 606 is also connected to one or more modular battery packs 610a, . . . , 610n, where each battery pack includes a trace unit, such as trace unit 510 described above in FIG. 5. Thus, each modular battery pack is a trace device (which is defined as any device that includes a trace unit). As described above in FIG. 5, trace units included in modular battery packs 610a, . . . , 610n may be configured to monitor various parameters about the modular battery packs and transmit the data to trace server 606.

Trace server 606 creates a traceability chain for each modular battery pack, where each traceability chain is uniquely identified by a Universal Trace Code (UTC). Each UTC is associated with a UPC (which uniquely identifies a modular battery pack, as described above); thus each traceability chain is uniquely associated with a modular battery pack. Each traceability chain includes all information available about the associated battery pack, such as manufacturing information (e.g., UPC, model number, capacity, manufacturer, manufactured date, etc.), historical information (e.g., use history such as number of charge cycles, total kilo-watt-hour charged or discharged, resale history, whether the battery was exposed to conditions that would affect the performance of the battery such as over/under temperature, over/under voltage, over current conditions), and current conditions of the battery (such as current capacity, charge cycle, capability to hold charge, internal resistance, coulombic efficiency, etc.). Based on these information, a modular battery pack's health condition and residual value may be efficiently and accurately determined.

When data is transmitted from the trace unit of a modular battery pack, the data is written into the traceability chain corresponding to the battery pack by trace server 606, which in turn writes the traceability chain into one or more blockchain ledgers 602 through blockchain interface 604, which functions as an interface. Because of the distributed nature of blockchain technology, usually data is stored in more than one blockchain ledgers 602.

One or more user devices 620a, . . . 620n may be connected to trace 606 and request certain data about any of modular battery packs 610a, . . . , 610n. User devices 620a, . . . 620n may be handheld devices (such as smartphones, tablet computers, etc.) or laptop computers or desktop computers, or other computing devices that are installed with applications to communicate with trace server 606. For example, when a modular battery pack is being resold in a secondary market or being exchanged at a battery exchange station, the transacting parties may want to know the fair market value of the modular battery pack. Therefore, the transaction parties may use a user device 620 to inquire the trace server 606 about inform (e.g., current conditions, historical information, manufacturing information, etc.) of the particular modular battery pack and evaluate the fair market value of the battery pack. More details about reselling and/or exchanging modular battery packs are described below.

Battery Reselling, Sharing, and Exchanging

Figure 7:
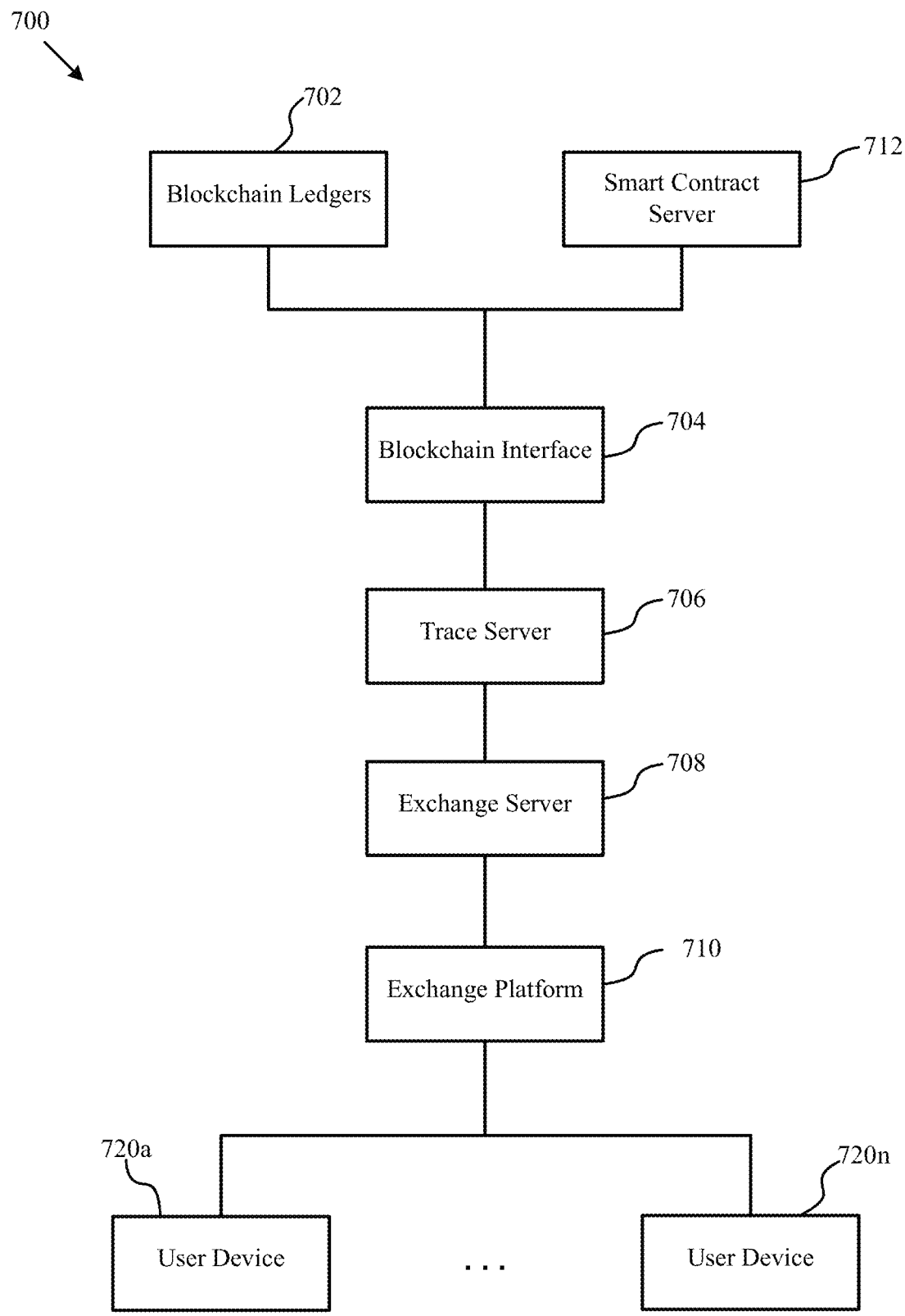
FIG. 7 illustrates a system for selling and/or exchanging modular battery packs according to one aspect of the present disclosure.

FIG. 7 illustrates a system 700 for selling, sharing, and/or exchanging modular battery packs according to one aspect of the present disclosure. System 700 includes an exchange server 708, which supports an exchange platform 710 (e.g., a website). In the depicted embodiment, exchange server 708 is connected to a trace server 706 which in turn is connected to one or more blockchain ledgers 702 and a smart contract server 712 through and a block chain interface 704. One or more user devices 720a, . . . , 720n may be connected to exchange server 708 for information about other uses reselling, sharing, and/or exchanging modular battery packs on the exchange platform 710. User devices 720a, . . . 720n may be handheld devices (such as smartphones, tablet computers, etc.) or laptop computers or desktop computers, or other computing devices that are installed with applications to communicate with exchange server 708. For example, through a user device a user may post a modular battery pack on exchange platform 710 for sale, rental, or exchange, and other users may read such post on the exchange platform and contact the posting user to make offers.

When a user attempts to buy, rent, or exchange a modular battery pack from another user, he may request the exchange server to retrieve data about the modular battery pack from the associated traceability chain from trace server 706 (which in turn inquires block ledgers 702 for the data). In this case, trace server 706 functions as an interface between exchange server 708 and blockchain ledgers 702, because the traceability data is stored in blockchain ledgers 702. In some embodiments, exchange server 708 may directly communicate with blockchain ledgers 702 through blockchain interface 704, in which case trace server 706 is not needed in the process.

Based on the information from the traceability chain associated with the modular battery pack, a fair market value can be determined for the modular battery pack. Therefore, the user may make an offer based on the accessed fair market value as a benchmark (e.g., not necessarily the exact amount of the accessed fair market value). When the seller and buyer reach an agreement, smart contract server 712 is triggered to create a smart contract for the sale. After the sale has been executed, the transaction is then written into one or more block ledgers 702 and added to the data block associated with the modular battery pack.

Battery Swapping and Renting

Figure 8:
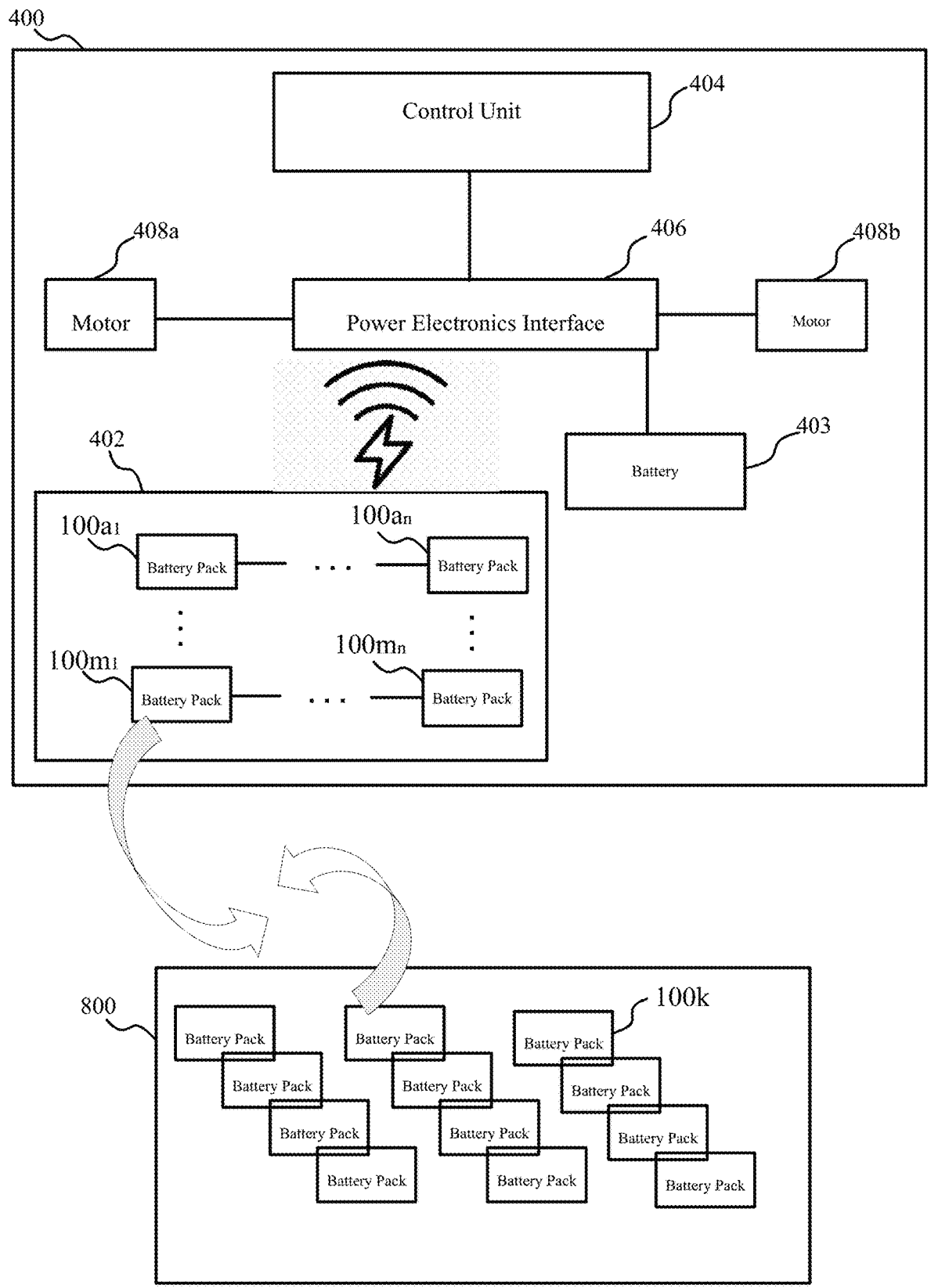
FIG. 8 illustrates a battery swapping and/or renting station where an electric vehicle can swap and/or rent one or more of its modular battery packs according to one aspect of the present disclosure.

FIG. 8 illustrates a battery swapping and/or renting station where an electric vehicle can swap one or more of its modular battery packs. In the depicted embodiment, battery swapping/renting station 800 stores a plurality of modular battery packs 100, all fully charged for renting and swapping. When electric vehicle 400 needs to rent and/or swap one or more of its battery packs, it stops at the swapping and/or renting station for the transactions. For example, battery pack 100$m1$ installed on electric vehicle 400 may have run low on charge and need to be recharged. Instead of waiting for battery pack 100$m1$ being charged at a charging station, the user may simply swap battery pack 100$m1$ with a fully charged battery pack 100$k$ at battery swapping and/or renting station, which is faster than recharging battery pack 100$m1$. Battery pack 100$m1$ is then left at the station for recharging and afterwards for swapping again. Additionally, if the user choses to, he may also rent one or more additional battery packs and install them on electric vehicle 400 for longer driving range of the vehicle. It should be understood that the battery swapping/renting station 800 described here may only provide either battery swapping or renting services in some embodiments and provide both services in other embodiments.

In some embodiments, a parking platform adjustable X-Y axes (i.e., the axes on the horizontal level) may be installed at the battery swapping/renting station 800 to regulate the planar position of electric vehicles. The station also include a battery pack storage racks adjustable in the Y-Z and/or X-Z axes (with Z-axis being the vertical axis), and one or more robots (or robotic arms) designed to exchange a charged modular battery pack on the storage racks with a modular battery pack in an electric vehicle. To exchange a modular battery pack of an electric vehicle, the driver of the vehicle only need to park his electric vehicle at any location on the parking platform. Then, the parking platform, battery storage racks, and a robot (or robotic arm) can coordinate together to swap a modular batter pack from the electric vehicle with another fully charged battery on the rack.

The station may include a detection system to determine which one or more modular battery packs, if the electric vehicle is installed with multiple modular battery packs, have low charges and need to be swapped. Further, once an electric vehicle arrives at the swapping/renting station, the system may connect data of the installed modular battery packs on the vehicle through a wireless channel, analyze its energy needs, and guide the electric vehicle to the appropriate parking platform for battery swapping and/or renting.

When swapping and/or renting one or more modular battery packs for an electric vehicle, the swapping and/or renting station may retrieve information about the modular battery packs form a trace server and/or blockchain ledger as described above to determine the fair market value of the modular battery packs and charge the electric vehicle user based on the assessment.

Recycle Use of Modular Battery Packs

Figure 9:
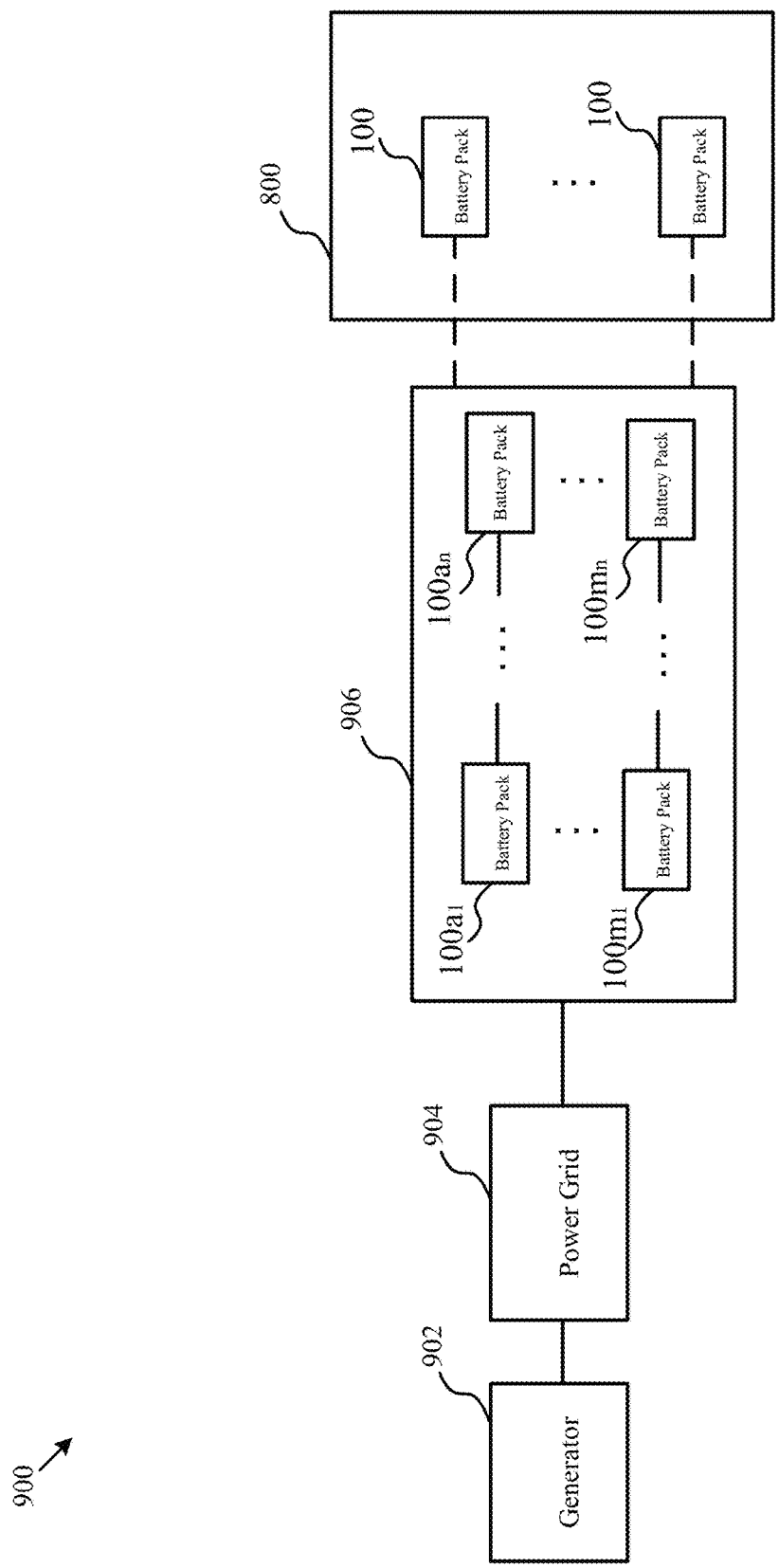
FIG. 9 illustrates a system where modular battery packs are recycled and/or used for different purposes according to one aspect of the present disclosure.

FIG. 9 illustrates a system 900 where modular battery packs are recycled and used in different applications. For example, in some embodiments, electric vehicles have higher quality requirements for battery packs while other applications, such as energy storage related to power grids have lower quality requirements for battery packs. Therefore, when modular battery packs on electric vehicles degrade to certain degree and no longer suitable for use on electric vehicles, such modular battery packs can be recycled and used to store electric energy from power grid, which are then in turn used to charge other modular battery packs such as those a battery swapping and/or renting station.

In the depicted embodiment, one or more generators 902 are connected to an energy source to generate electricity and supply power to a power grid 904. For example, generators 902 may be powered by wind turbines, solar panels, hydraulic turbines, or nuclear energy sources. One or more battery pack modules 506 (which may be recycled or new modular battery packs) may be connected to power grid 504 and store redundant electricity from power grid 504. At a certain time period, redundant power may be the amount electricity supplied by power grid that exceeds the amount of electricity needed by consumers connected to the power grid. Usually, such redundant power is wasted. However, battery pack modules 906 can store such redundant power that would have otherwise be wasted and then be used to supply electricity when needed, e.g., at a lower price. For example, electricity stored in battery modules 906 may be used to charge other modular battery packs 100 at a battery swapping and/or renting station (e.g., swapping and/or renting station 800 as described in FIG. 8), or to charge other electric devices. This saves energy and also allows battery swapping and/or renting station to charge modular battery packs 100 at a lower price. Further, individual battery packs 100 used in battery pack module 906 may be degraded battery packs recycled from other applications such as electric vehicles, which further reduces the cost of storing and supplying electricity to consumers.

Ecosystem of Modular Battery Packs

Figure 10:
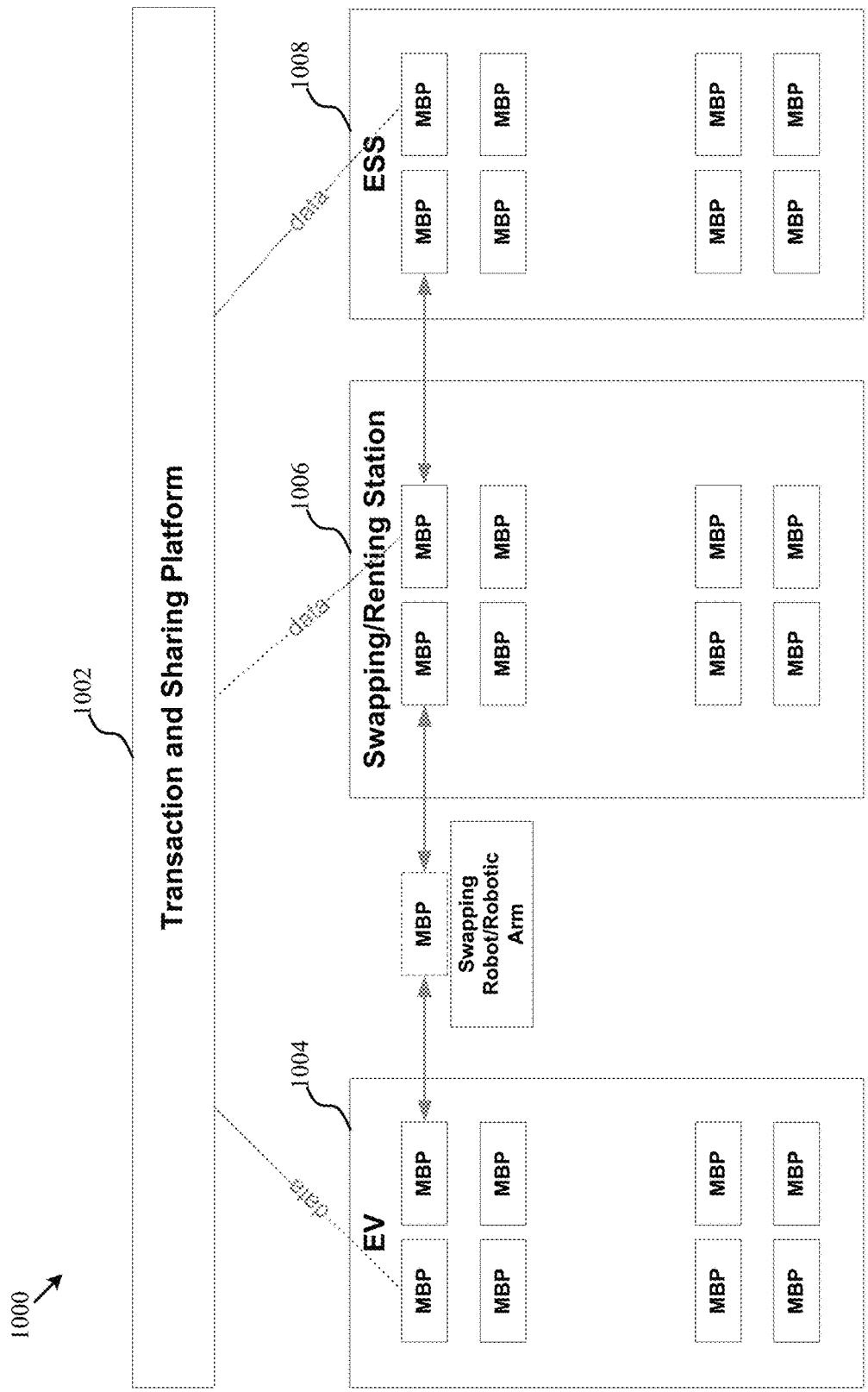
FIG. 10 illustrates an ecosystem involving various applications of modular battery packs according to one aspect of the present disclosure.

FIG. 10 illustrates an ecosystem 1000 involving various applications of modular battery packs according to one aspect of the present disclosure. In the depicted embodiment, a plurality of modular battery packs (MBP) are installed on an electric vehicle 1004. Each MBP include a trace unit (such as that described in FIG. 5) that collects data about the MBP and send the data to a data management system (such as a blockchain system as described above in FIG. 6). When one or more MBPs in electric vehicle 1004 run low on charge, the electric vehicle can be driven to a battery swapping and/or renting station 1006 (such as that described in FIG. 8) to swap out the MBPs with low charges or to rent additional MBPs. When one or more MBPs on electric vehicle 1004 have degraded to a level where they would not satisfy the needs of the electric vehicle, such MBPs may be recycled and used in an energy storage system 1008 (such as that described in FIG. 9). Further, an owner of an MBP (e.g., owner of electric vehicle 1004 or owner of swapping/renting station 1008, or owner of energy storage system 1008) can sell, rent, or exchange his MBPs on a transaction and sharing platform 1002, such as that described above in FIG. 7.

While MBPs are used in the whole ecosystem 1000, data about the MBPs are continually generated and stored. The data is then used to determine the health condition and residual value of the MBP so that the price of the MBP can be determined during a sale, rental, or exchange of the MBP.

Methods for Making and Using Modular Battery Packs and Related Systems

Figure 11:
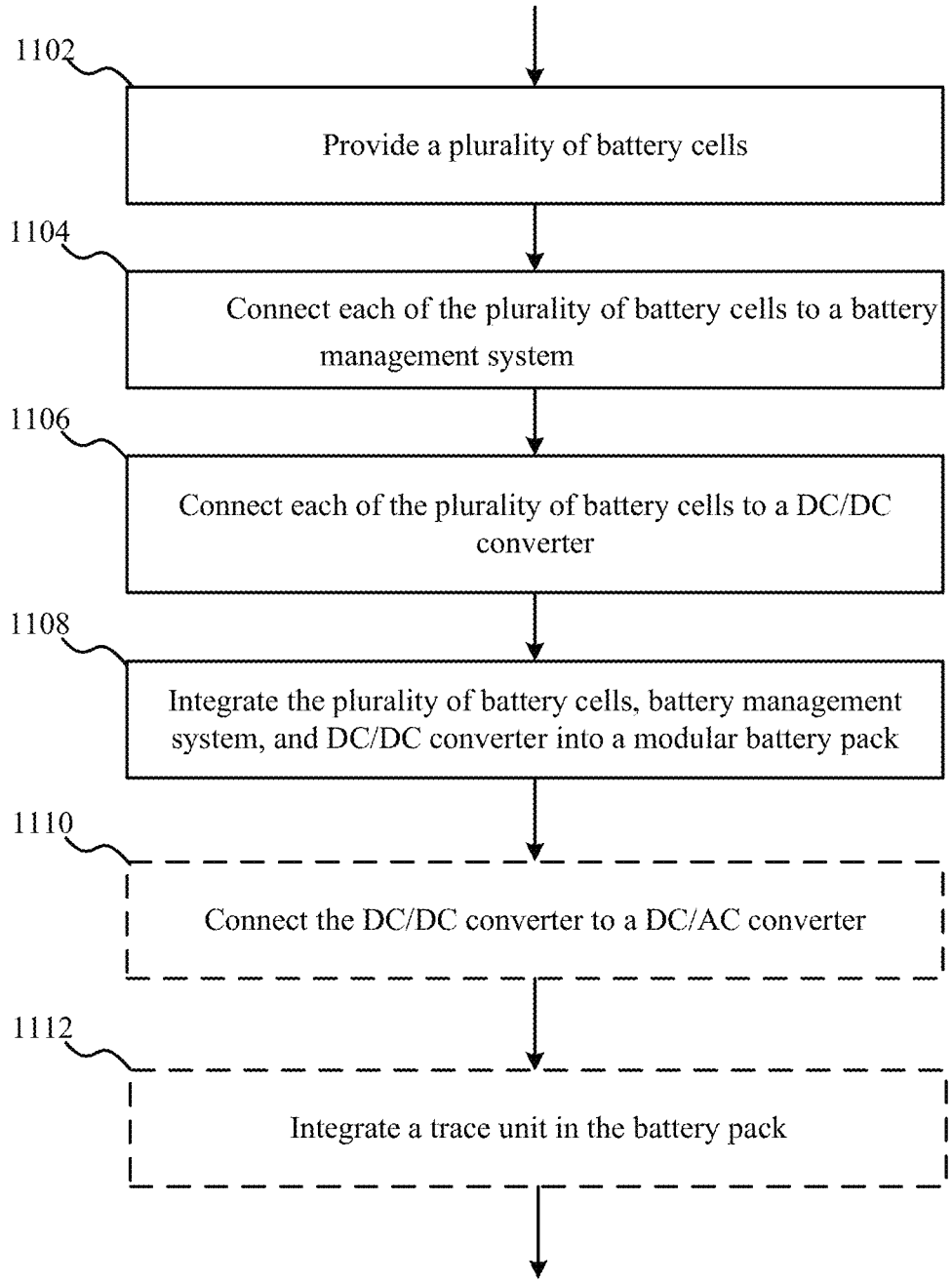
FIG. 11 illustrates a method for manufacturing a modular battery pack according to one aspect of the present disclosure.

FIG. 11 illustrates a method 1100 for manufacturing a battery pack according to one aspect of the present disclosure. At step 1102, a plurality of battery cells are provided. Each battery cell may have the same or different capacities. The plurality of battery cells are connected to a battery management system at step 1104. The battery management system may be configured to monitor the health level and working conditions of each of the plurality of battery cells, and send signals to indicating devices to indicate the status of the battery cells, and shut off one or more of the battery cells when they are not working in their predetermined normal working conditions.

As step 1106, the battery cells are connected to a DC/DC converter, which functions to change the output voltage level that an individual battery cell can provide. The DC/DC converter may be a CLLC resonant converter, or a full bridge converter, or other DC-to-DC converter topologies. At step 1108, the plurality of battery cells, battery management system, and DC/DC converter is integrated into a modular battery pack that can be readily connected to another modular battery pack. Optionally, at step 1110, a DC/AC converter is connected to the DC/DC converter and also integrated into the modular battery pack. The DC/AC converter may be set to inactivated in default mode and be activated when needed. At step 1112, a trace unit such as that described above in FIG. 5 is integrated into the battery pack.

Figure 12:
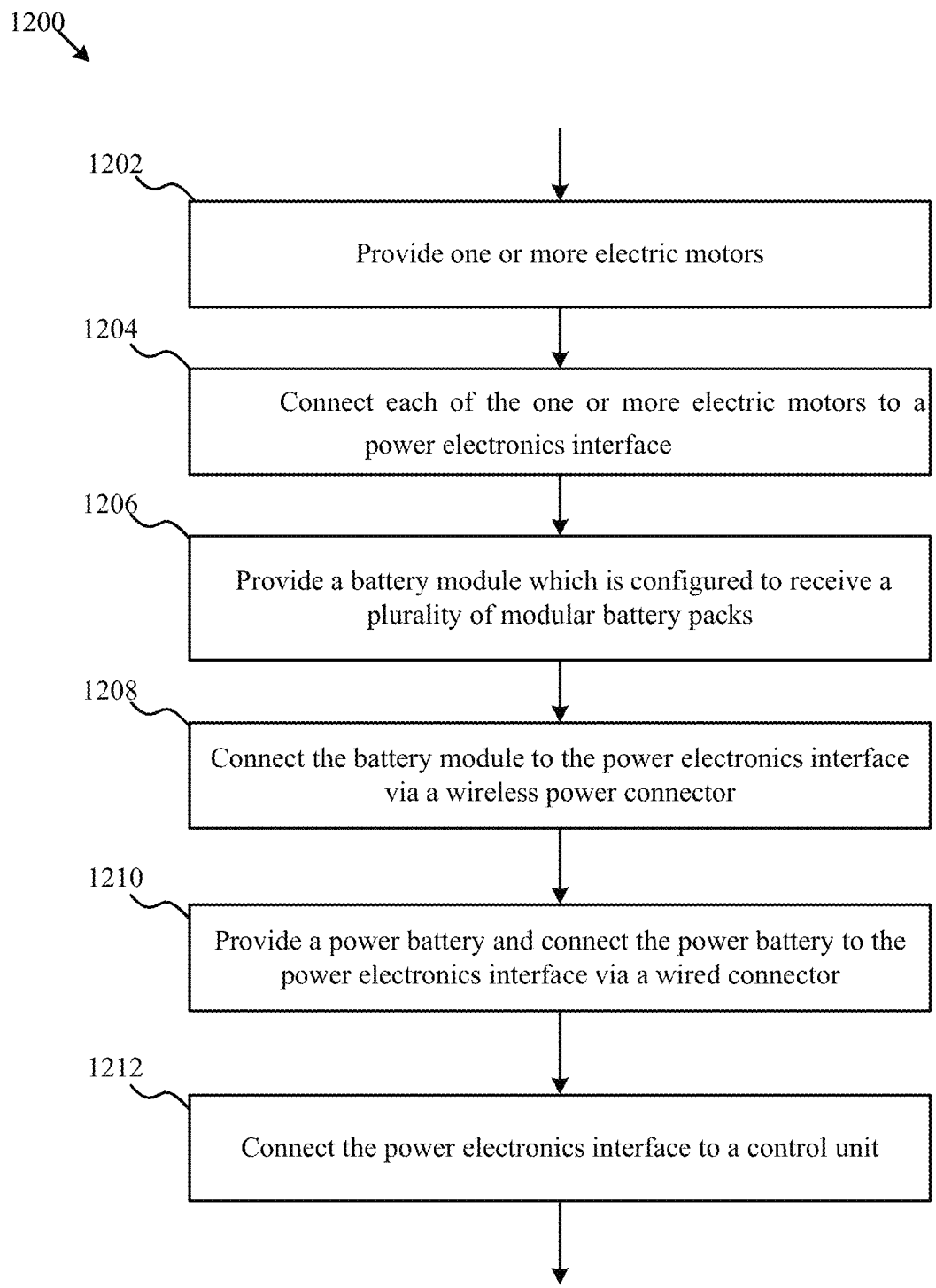
FIG. 12 illustrates a method for manufacturing an electric vehicle configured to be powered by a number of modular battery packs according to one aspect of the present disclosure.

FIG. 12 illustrates a method 1200 for manufacturing an electric vehicle configured to be powered by a number of modular battery packs. In the depicted embodiment, method 1200 includes providing 1202 one or more electric motors, and connecting 1204 each of the one or more electric motors to a power electronics interface. Step 1206 provides a battery module, which is configured to receive a plurality of modular battery packs, such as those described above in connection with FIGS. 1-5. At step 1208, the battery module is connected to the power electronics interface via a wireless power. At step 1210, a power battery is provided and connected to the power electronics interface via a wired connector. At step 1212, a control unit is connected to the one or more electric motors and battery module to control the functioning of the electric motors and battery module.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A battery pack comprising:
    a plurality of battery cells, each configured to store electric energy;
    a battery management system electrically coupled to the plurality of battery cells, the battery management system configured to monitor a status of each of the plurality of battery cells;
    a trace unit configured to monitor one or more parameters of the battery pack; and
    a dedicated battery configured to operate the trace unit;
    where the trace unit is configured to monitor a charge level of the dedicated battery and to charge the dedicated battery in response to a determination that the charge level of the dedicated battery is lower than a predetermined threshold.

2. The battery pack of claim 1, where the trace unit comprises one or more sensors configured to monitor the one or more parameters of the battery pack, where the one or more parameters include one or more of: temperature, voltage, humidity, maximum charge, current capacity, adverse conditions, internal resistance, and coulombic efficiency.

3. The battery pack of claim 1, where the battery management system is configured to monitor the temperatures of the plurality of battery cells, and to control the temperature of the battery pack by turning off one or more of the plurality of battery cells.

4. The battery pack of claim 1, where the trace unit comprises a wireless communication interface, and the trace unit is configured to periodically transmit data related to the one or more parameters to a server through a wireless communication channel via the wireless communication interface.

5. The battery pack of claim 4, where a frequency of data transmission from the trace unit to the server is determined by a first command received by the trace unit from the server.

6. The battery pack of claim 4, where the trace unit is configured to transmit data related to an operating status of the trace unit to the server in response to a second command from the server.

7. The battery pack of claim 4, where the trace unit is configured to transmit data related to a residual value of the battery pack to the server in response to a third command from the server.

8. A method for making a battery pack, the method comprising:
    providing a plurality of battery cells, each configured to store electric energy;

providing a battery management system and electrically coupling the battery management system to the plurality of battery cells, where the battery cell management system is configured to monitor a status of each of the plurality of battery cells;

providing a trace unit, where the trace unit is configured to monitor one or more parameters of the battery pack;

providing a dedicated battery to operate the trace unit; and packaging the plurality of battery cells, the battery management system, the trace unit, and the dedicated battery into a modularized unit to form a modular battery pack;

where the trace unit is configured to monitor a charge level of the dedicated battery and charge the dedicated battery in response to a determination that the charge level of the dedicated battery is lower than a predetermined threshold.

9. The method of claim 8, where the trace unit comprises one or more sensors configured to monitor the one or more parameters of the battery pack, where the one or more parameters include one or more of: temperature, voltage, humidity, maximum charge, current capacity, adverse conditions, internal resistance, and coulombic efficiency.

10. The method of claim 8, where the battery management system is configured to monitor the temperatures of the plurality of battery cells, and to control a temperature of the modular battery pack by turning off one or more of the plurality of battery cells.

11. The battery pack of claim 3, where the battery management system is configured to turn off one or more of the plurality of battery cells, but not all battery cells in the battery pack, in response to a determination that the temperature of the one or more of the plurality of battery cells is greater than a predetermined high threshold.

12. The battery pack of claim 5, where the frequency of data transmission is selected to minimize power consumption by the trace unit.

13. The battery pack of claim 1, where the battery pack is included in a modularized unit to form a first modular battery pack, and where the first modular battery pack is configured to be connected with a second modular battery pack to form a larger battery pack, and where the second modular battery pack is substantially identical to the first modular battery pack.

14. The battery pack of claim 4, where the trace unit further comprises a memory configured to store data related to the one or more parameters, and where the trace unit is configured to automatically erase data stored in the memory after the data is transmitted to the server.

15. The method of claim 10, where the battery management system is configured to turn off one or more of the plurality of battery cells, but not all battery cells in the modular battery pack, in response to a determination that the temperature of the one or more of the plurality of battery cells is greater than a predetermined high threshold.

16. The method of claim 8, where the trace unit comprises a wireless communication interface, and the trace unit is configured to periodically transmit data related to the one or more parameters to a server through a wireless communication channel via the wireless communication interface, and where a frequency of data transmission from the trace unit to the server is determined by a first command received by the trace unit from the server.

17. The method of claim 8, where the modular battery pack is configured to be connected with a second modular battery pack to form a larger battery pack, and where the second modular battery pack is substantially identical to the modular battery pack.

18. The battery pack of claim 1, where the battery pack further comprises a wireless power connector and where the battery back is configured to supply electric power to an electronic device via the wireless power connector through a wireless connection.

19. A battery pack comprising:
a plurality of battery cells, each configured to store electric energy;
a battery management system electrically coupled to the plurality of battery cells, the battery management system configured to monitor a status of each of the plurality of battery cells; and
a trace unit configured to monitor one or more parameters of the battery pack;
where the trace unit comprises a dedicated battery to operate the trace unit; and where the trace unit is configured to monitor a charge level of the dedicated battery and request the battery pack to charge the dedicated battery in response to a determination that the charge level of the dedicated battery is lower than a predetermined threshold.

20. The battery pack of claim 19, where the trace unit comprises a wireless communication interface, and the trace unit is configured to periodically transmit data related to the one or more parameters to a server through a wireless communication channel via the wireless communication interface, and where a frequency of data transmission from the trace unit to the server is determined by a first command received by the trace unit from the server.

* * * * *